(12) United States Patent
Matsuo et al.

(10) Patent No.: US 7,706,972 B2
(45) Date of Patent: Apr. 27, 2010

(54) NAVIGATION APPARATUS, IMAGE DISPLAY METHOD, AND PROGRAM FOR THE IMAGE DISPLAY METHOD

(75) Inventors: Shigeru Matsuo, Ibaraki (JP); Hirohisa Miyazawa, Kanagawa (JP)

(73) Assignee: Xanavi Informatics Corporation, Zama-shi (JP)

( * ) Notice: Subject to any disclaimer, the term of this patent is extended or adjusted under 35 U.S.C. 154(b) by 690 days.

(21) Appl. No.: 11/443,073

(22) Filed: May 31, 2006

(65) Prior Publication Data
US 2007/0150180 A1    Jun. 28, 2007

(30) Foreign Application Priority Data
May 31, 2005    (JP)    ............... 2005-158667

(51) Int. Cl.
G01C 21/30    (2006.01)
(52) U.S. Cl. .................. 701/208; 340/988; 345/581; 345/531; 345/214; 382/178
(58) Field of Classification Search ............... 701/208, 701/207; 359/462; 348/148; 340/435, 988; 345/581, 688, 162, 531, 214, 33; 382/178; G01C 21/30
See application file for complete search history.

(56) References Cited

U.S. PATENT DOCUMENTS

| | | | | |
|---|---|---|---|---|
| 4,757,455 A | * | 7/1988 | Tsunoda et al. | 701/208 |
| 5,264,964 A | * | 11/1993 | Faris | 359/465 |
| 5,313,392 A | * | 5/1994 | Temma et al. | 705/27 |
| 5,416,478 A | * | 5/1995 | Morinaga | 340/995.27 |
| 5,739,848 A | * | 4/1998 | Shimoura et al. | 348/119 |
| 5,826,212 A | | 10/1998 | Nagai | |
| 6,169,516 B1 | * | 1/2001 | Watanabe et al. | 342/357.13 |
| 6,553,299 B1 | * | 4/2003 | Keller et al. | 701/50 |
| 6,853,912 B2 | * | 2/2005 | Han | 701/208 |
| 7,272,497 B2 | * | 9/2007 | Koshiji et al. | 701/211 |
| 2004/0240056 A1 | | 12/2004 | Tomisawa et al. | |

(Continued)

FOREIGN PATENT DOCUMENTS

JP    7-332994 A    12/1995

(Continued)

OTHER PUBLICATIONS

European Search Report dated Oct. 18, 2006 (Eight (8) pages).

*Primary Examiner*—Tuan C To
(74) *Attorney, Agent, or Firm*—Crowell & Moring LLP

(57) ABSTRACT

A navigation apparatus which includes a front image display displaying an image of a front side and a back image display displaying an image of a back side, the each image being one of images stereoscopically overlapped along the line of sight; a front image signal; a measuring unit for measuring a current position of own vehicle; a map storage unit; a controller for controlling each unit, wherein the controller reads map data of a predetermined area and determines if an elevated road exists in the area, wherein when the elevated road exists, the controller checks whether or not the current position of the own vehicle is on the elevated road, and wherein when the current position is not on the elevated road, the front image display draws the image of the elevated road so that an image drawn on the back image display can be visually percepted.

11 Claims, 15 Drawing Sheets

U.S. PATENT DOCUMENTS

| | | | |
|---|---|---|---|
| 2004/0267443 A1* | 12/2004 | Watanabe | 701/201 |
| 2005/0078369 A1* | 4/2005 | Blanchard | 359/462 |
| 2005/0110621 A1* | 5/2005 | Hahn et al. | 340/435 |
| 2005/0134966 A1* | 6/2005 | Burgner | 359/630 |
| 2005/0200700 A1* | 9/2005 | Schofield et al. | 348/148 |
| 2005/0261826 A1* | 11/2005 | Kurosawa et al. | 701/208 |
| 2005/0270372 A1* | 12/2005 | Henninger, III | 348/143 |
| 2005/0278111 A1* | 12/2005 | Ujino | 701/200 |
| 2006/0233461 A1* | 10/2006 | Ma et al. | 382/285 |

FOREIGN PATENT DOCUMENTS

| | | |
|---|---|---|
| JP | 9-222851 A | 8/1997 |
| JP | 2000-310544 A | 11/2000 |
| JP | 2001-311625 A | 11/2001 |
| JP | 2003-114130 A | 4/2003 |
| JP | 2004-361465 A | 12/2004 |

* cited by examiner

FIG. 3
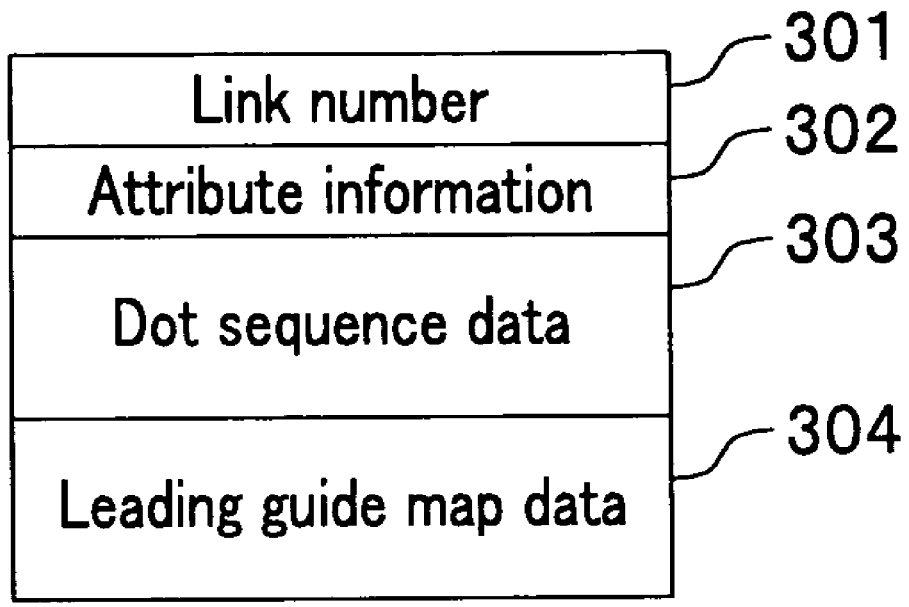
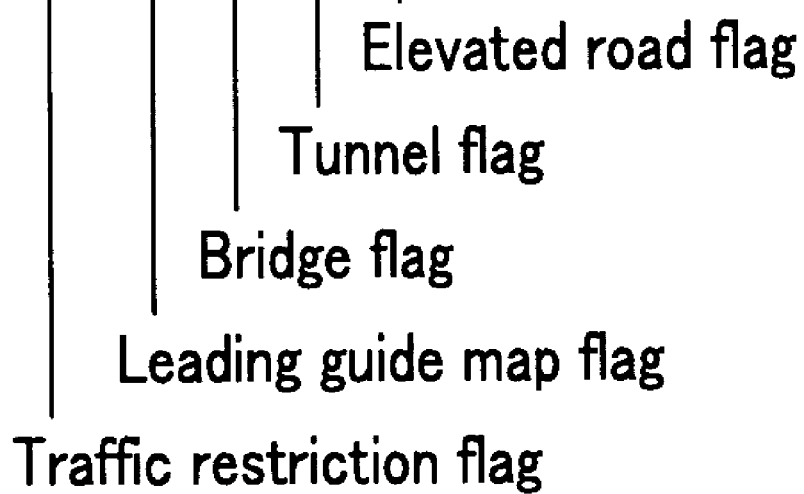

NAVIGATION APPARATUS, IMAGE DISPLAY METHOD, AND PROGRAM FOR THE IMAGE DISPLAY METHOD

CROSS REFERENCE TO RELATED APPLICATIONS

This application claims the foreign priority benefit under Title 35, United States Code, §119(a)-(d) of Japanese Patent Application No. 2005-158667, filed on May 31, 2005, the contents of which are hereby incorporated by reference.

BACKGROUND OF THE INVENTION

1. Field of the Invention

The present invention relates to a navigation apparatus, and more particularly to a navigation apparatus having a display capable of stereo display.

2. Description of Relevant Art

Conventionally, as a display capable of stereo display, a system where two panels are disposed with a given distance to each other so as to display a superimposed image on the line of sight of an observer, and the superimposed image can be visually percepted as a stereo image through observation of images displayed on the two panels, has been developed. This is disclosed in claim 1 of Japanese Laid-Open Patent Publication No. 2004-361465.

In the above display method, two same images are displayed on the two panels respectively so that the two same images are superimposed, and luminance of the images is differentiated according to a depth of the panel. The luminance of a front panel is increased for an object located at a front side, and that of a back panel is increased for an object located at a back side. With the above, an object can be displayed as if it is located at a middle position of two panels.

In addition, there exists a navigation apparatus for displaying a quarter guide map (This is disclosed in, for example, claim 1 of Japanese Laid-Open Patent Publication No. 2001-311625), and an enlarged intersection map (This is disclosed in, for example, claim 1 of Japanese Laid-Open Patent Publication No. H7-332994). These displays are important guide displays for informing a driver of a leading direction and a destination, thereby resulting in requirement of a high visual perceptibility.

In the navigation apparatus, it is necessary to display an elevated road and a road (hereinafter, referred to as non-elevated road) constructed under the elevated road. If a status where the elevated road is overlapped with the non-elevated road in above and below is displayed in a two-dimensional plane, a display of the non-elevated road is hidden by a display of the elevated road. Therefore, it becomes difficult to distinguish whether a car mark showing an own vehicle is on the elevated road or the non-elevated road, as well as the visual perceptibility of the display of the non-elevated road is decreased. Therefore, if a case where the display method described in the Japanese Laid-Open Patent Publication No. 2004-361465 is applied to a display of the elevated road is considered, that is, if the elevated road is displayed on the front panel and the non-elevated road is displayed on the back panel along the line of sight, the elevated road is always displayed on the front panel with high luminance, thereby resulting in difficulty to see the car mark when the own vehicle runs on the non-elevated road under the elevated road. In addition, the display methods of the quarter guide map and enlarged intersection map described in the Japanese Laid-Open Patent Publication Nos. 2001-311625 and H7-332994 have been poor in the visual perceptibility, because the maps and the car mark are displayed together on same display.

It is, therefore, an object of the present invention to improve a visual perceptibility of an elevated road in a planar map display where the elevated road is overlapped with a non-elevated road in above and below.

It is another object of the present invention to improve a visual perceptibility of a leading guide map which is displayed by superimposing the map on a map display.

SUMMARY OF THE INVENTION

According to a first aspect of the present invention, there are provided a navigation apparatus, an image display method, and an image display program which are characterized in that when a control means determines that there exists an elevated road and a current position of an own vehicle is located lower than the elevated road, a front side image display means draws an image of the elevated road so that an image drawn on the back side image display means can be visually percepted, or when the current position of the own vehicle is in a predetermined position, the front side image display means displays a leading guide map on the front side image display means.

According to a second aspect of the present invention, there are provided a navigation apparatus, an image display method, and an image display program which are characterized in that when the control means determines that there exists an elevated road and a current position of the own vehicle is located lower than the elevated road, a right eye image display means and a left eye image display means draw an image of the elevated road which is drawn on a back side image display means so that the image can be visually percepted, or when the current position of the own vehicle is in a predetermined position, the right eye image display means and the left eye image display means display a leading guide map on the front side image display means.

In the present invention, a visual perceptibility of the elevated road in a planar map display where the elevated road is overlapped with a non-elevated road in above and below can be improved.

In addition, a visual perceptibility of a leading guide map which is displayed by being overlapped with a map display can be improved.

BRIEF DESCRIPTION OF THE DRAWINGS

FIG. 3 is an illustration showing a configuration of road data stored in a map storage unit;

DETAILED DESCRIPTION OF THE PREFERRED EMBODIMENT

First Embodiment

Herein below, a navigation apparatus of a first embodiment according to the present invention will be explained in detail by referring to figures.

Figure 1:
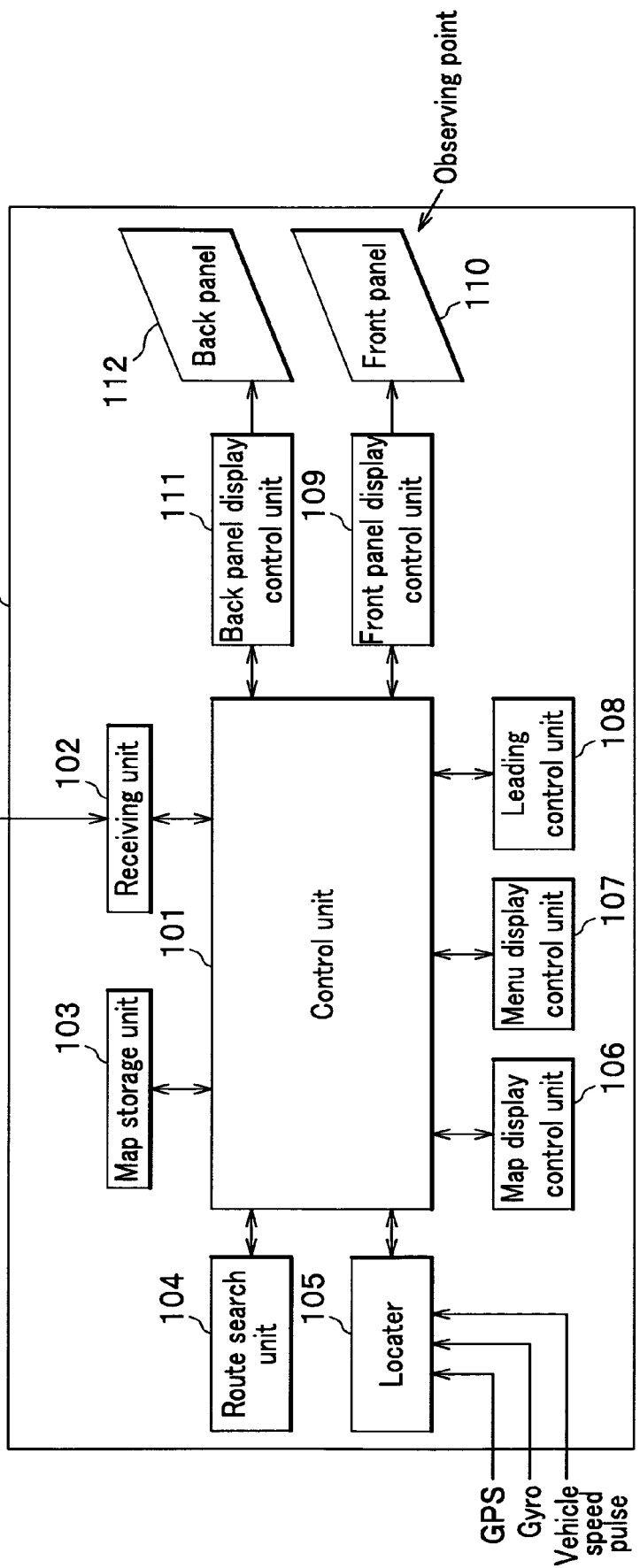
FIG. 1 is a block diagram showing a configuration of an in-vehicle navigation system according to the first embodiment of the present invention.

FIG. 1 is a block diagram showing a configuration of an in-vehicle navigation system according to the first embodiment.

The navigation system is configured to include a navigation apparatus 1 and an input apparatus 2 such as a remote controller. The navigation apparatus 1 is configured to include a CPU (Central Processing Unit), a ROM (Read Only Memory), a RAM (Random Access Memory, various kinds of interfaces, and electronic circuits. The navigation apparatus 1 includes a control unit 101 (control means) for controlling a whole navigation apparatus 1, a receiving unit 102 for receiving a signal transmitted from the input apparatus 2, map data containing such as feature information, road data contained in the map data, a map storage unit 103 (map storage means) for storing such as destination data, a route search unit 104 for implementing a route search from a current position of a vehicle on which the system is mounted to the destination, a locator 105 (measuring means) for measuring a current position of an own vehicle by using a vehicle speed pulse, a gyro signal, and a GPS (Global Positioning System) signal, a map display control unit 106 (map display control means) for implementing transformation of such as a display scale and rotation for the map data, a menu display control unit 107 for instructing such as a display of a menu screen to retrieve a destination, a leading control unit 108 for, for example, calculating and checking a distance from an own vehicle position to an intersection where the own vehicle turns or a distance between the own vehicle and the intersection, and for determining whether or not a display of a leading screen exists based on the distance, a front panel 110 (front side image display means) and a back panel 112 (back side image display means), which are disposed with a distance of 5 mm to 1 cm to each other, so that both panels are overlapped along the line of sight, and a front panel display control unit 109 and back panel display control unit 111 for executing a display control of each panel.

Meanwhile, the navigation apparatus 1 is realized by using a computer which includes, such as a CPU (Central Processing Unit), a RAM (Random Access Memory), a ROM (Read Only Memory), a hard disk drive, and an input/output interface. A function of each unit (such as the control unit 101), which is shown in FIG. 1, of the navigation apparatus 1 is achieved by transferring programs from the hard disk drive to the RAM and executing them in the CPU.

Figure 2:
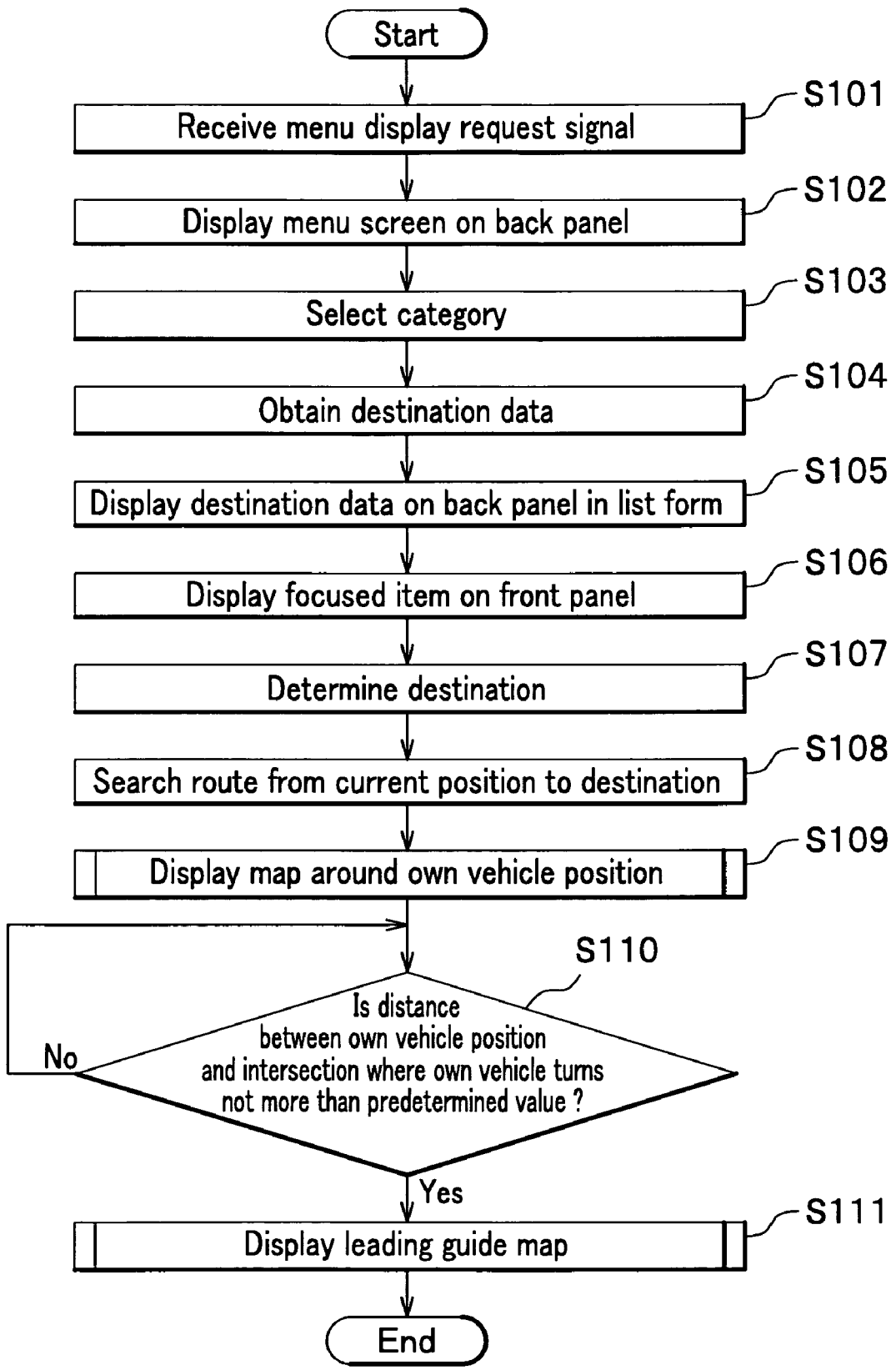
FIG. 2 is a flowchart showing a flow of processing of a map display for one screen according to the first embodiment.

FIG. 2 is a flowchart showing a flow of processing of a map display for one screen according to a first embodiment. Processing of the navigation apparatus will be explained by referring to FIG. 2 together with FIG. 1.

First, the receiving unit 102 receives a menu display request signal from the input apparatus 2 (S101), and transmits it to the menu display control unit 107 through the control unit 101. Next, the menu display control unit 107 instructs the back panel display control unit 111 to display a menu screen for retrieving a destination through the control unit 101. The back panel display control unit 111, which is instructed, displays the menu screen for retrieving the destination on the back panel 112 (S102). For example, when the destination is retrieved through a category, several kinds of categories are displayed on the menu screen, and one of the categories is selected by a user through the input apparatus 2 (S103). That is, when the control unit 101 obtains a category signal from the input apparatus 2 through the receiving unit 102, the control unit 101 obtains destination data belonging to the category from the map storage unit 103 (S104).

Then, the control unit 101 transmits the obtained destination data to the back panel display control unit 111, and simultaneously instructs the back panel display control unit 111 to display the destination data in a list form. The back panel display control unit 111, which is instructed, displays the transmitted destination data in the list form on the back panel 112 (S105). In addition, the control unit 101 instructs the front panel display control unit 109 to display a focused item in the list, for example, by a reason that the user has an intention to select. The front panel display control unit 109, which is instructed, displays the focused item on the front panel 110 (S106). Meanwhile, processing of the step S106 is not always necessary. By executing the processing of the step 106, the focused item can be highlighted. Then, the item is selected by the user through the input apparatus 2, and the destination is determined (S107). That is, the destination is determined by inputting a destination determination signal in the control unit 101 through the input apparatus 2 and receiving unit 102.

Next, the control unit 101 obtains a current position of the own vehicle from the locator 105. The current position is measured by the locator 105 by using the vehicle speed pulse, and signals of the gyro and GPS, which are input in the locator 105. Then, the control unit 101 transmits the current position and destination data of the destination which is determined at step S107 to the route search unit 104. Then, the route search unit 104 searches a route to the destination from the current position based on the transmitted current position data and the destination data (S108). The route search unit 104 transmits a searched route to the control unit 101 and the leading control unit 108. The control unit 101 obtains map data around an own vehicle position from the map storage unit 103 based on the transmitted route, and displays a map around the own vehicle position (S109). The details will be described later by referring to FIG. 4 to FIG. 6. A road of the route to the destination may be displayed with a color different from that of other roads.

Meanwhile, the leading control unit 108 always calculates an own vehicle position and a distance to an intersection where the own vehicle turns, based on current position data input from the locator 105 through the control unit 101 and the route transmitted from the route search unit 104, and always checks whether or not the distance between the own vehicle position and the intersection where the own vehicle turns is not more than a predetermined value (S110). If the leading control unit 108 determines that the distance between the own vehicle position and the intersection where the own vehicle turns is more than the predetermined value (S110→No), the processing returns to the step 110. If the leading control unit 108 determines that the distance between the own vehicle position and the intersection where the own vehicle turns is not more than the predetermined value (S110→Yes), the leading control unit 108 executes processing for displaying the leading guide map at step S111 and ends processing of a map display for one screen. Details of step S111 will be described later by referring to FIG. 7 to FIG. 11.

FIG. 3 is an illustration showing a configuration of road data stored in a map storage unit.

A link number 301 is a number assigned to each link. Here, the link is a segment (road) between a node to another node which indicates, for example, an intersection or an end point of a road. Attribute information 302 stores attributes of the link, and stores, for example, an elevated road flag (information which indicates whether or not a feature is an elevated road) which indicates that a link is an elevated link, a tunnel flag which indicates a link is in a tunnel, a bridge flag which indicates a link is on a bridge, a leading guide map flag which indicates an existence of data indicating a direction of a branch at an intersection, and a traffic restriction flag which indicates a traffic restriction such as a one-way street. Dot sequence data 303 shows a shape of a link with a coordinate value of a line plot. Leading guide map data 304 is image data which exists when the leading guide map flag is set.

Figure 4:
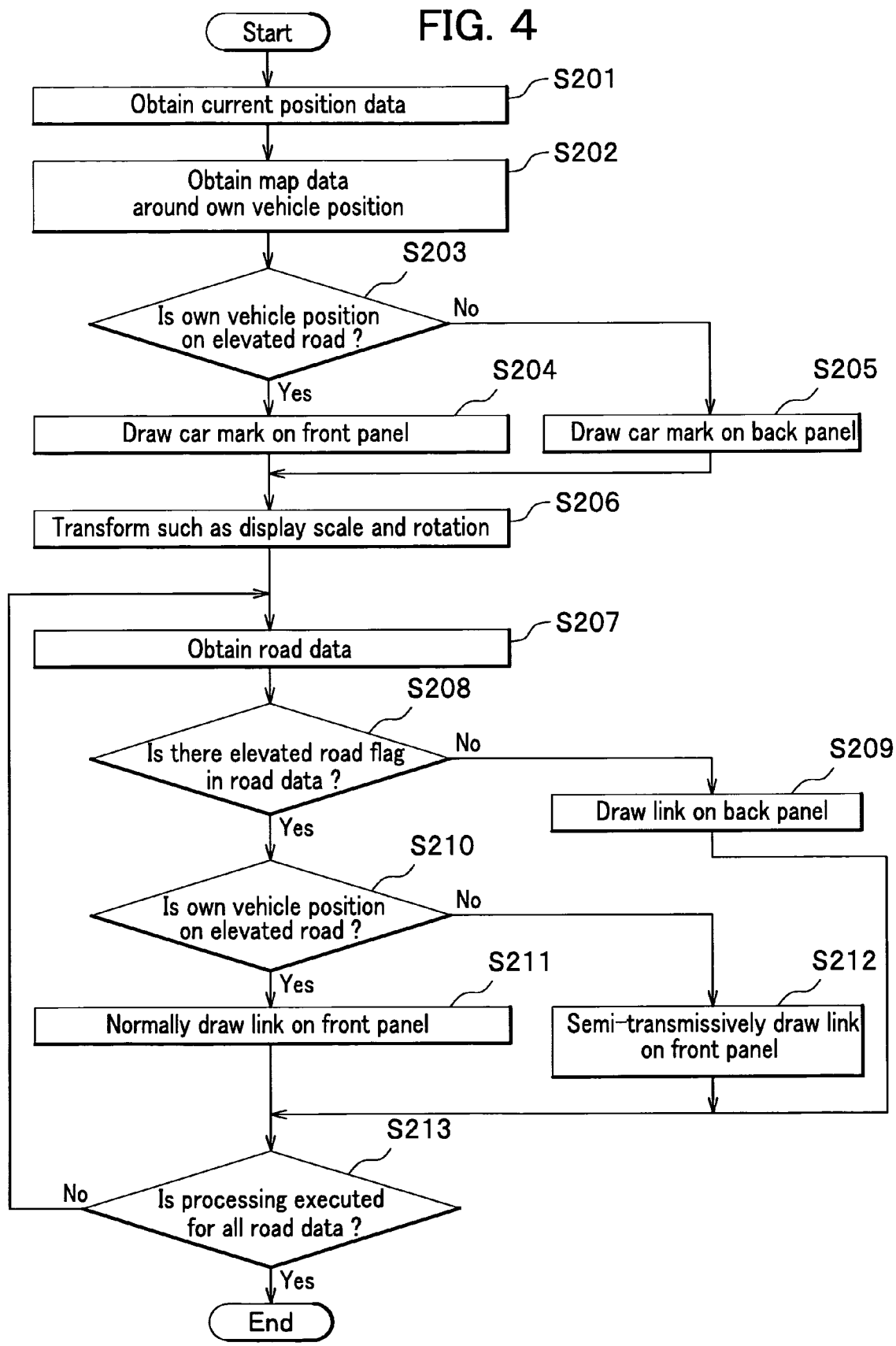
FIG. 4 is a flowchart showing a flow of processing for executing a map display around an own vehicle position according to the first embodiment.

Next, processing of a map display using road data will be explained by referring to FIG. 4 together with FIG. 1 and FIG. 3. FIG. 4 is a flowchart showing a flow of processing for implementing the map display around an own vehicle according to the first embodiment.

Meanwhile, steps S201 to S205 are processing for displaying a car mark, and steps S206 to S213 are processing for drawing a link.

First, the control unit 101 obtains current position data of an own vehicle from the locator 105 (S201). Next, the control unit 101 transmits the current position data of the own vehicle, which is obtained at the step S201, to the map display control unit 106. Then, the map display control unit 106 obtains map data (for one screen, a predetermined area including a current position of the own vehicle) around an own vehicle position from the map storage unit 103 based on obtained current position data of the own vehicle (S202). Then, the control unit 101 checks whether or not the own vehicle position is on an elevated road based on the current position data obtained by the control unit 101 and road data included in the map data, with respect to the map data of a display area (area for one screen) of the predetermined area where the own vehicle position is included, as a checking target (S203). Specifically, a status whether the own vehicle exists on an elevated road or a non-elevated road is determined based on information obtained by the locator 105. That is, information of the gyro input in the locator 105 includes information of an up and down motion of the own vehicle. The map data obtained at the step S202 includes road data as aforementioned, and the elevated road flag is set in each link of the road data. The control unit 101 calculates a link where the own vehicle exists from the current position. Then, the control unit 101 checks whether or not the own vehicle exists on the elevated road based on the information of the up and down motion of the vehicle and the elevated road flag. If the own vehicle position is determined to be on the elevated road by the control unit 101 (S203→Yes), the control unit 101 instructs the front panel control unit 109 to draw the car mark on the front panel 110. The front panel control unit 109, which is instructed, draws the car mark on the front panel 110 (S204), and the processing proceeds to step S206.

If the control unit 101 determined that the own vehicle is not on the elevated road at the step S203 (S203→No), the control unit 101 instructs the back panel display control unit 111 to draw the car mark on the back panel 112. The back panel display control unit 111, which is instructed, draws the car mark on the back panel 112 (S205), and the processing proceeds to step S206.

The map display control unit 106 implements transformation of, such as a display scale and rotation, for fitting map data, which is obtained on a display screen, to the display screen (S206), and transmits the transformed map data to the control unit 101. Then, the control unit 101 obtains road data, which is included in obtained map data, of an arbitrary link (S207). After that, the control unit 101 investigates the attribute information 302 of the obtained road data, and checks whether or not the elevated road flag exists (S208). If the elevated road flag does not exist, that is, if the link is not the elevated road (S208→No), the control unit 101 transmits the road data to the back panel display control unit 111, and simultaneously instructs the back panel display control unit 111 to draw the link on the back panel 112. The back panel display control unit 111, which is instructed, draws the link on the back panel 112 based on dot sequence data 303 of the transmitted road data (S209).

If the elevated road flag exists in the road data obtained by the control unit 101 at the step S208, that is, if the link is an elevated road (S208→Yes), a content of drawing is changed according to a status of the own vehicle position. First, the control unit 101 checks whether or not the own vehicle position is on an elevated road (S210). A checking method of whether or not the own vehicle position is on the elevated road is same as that used at the step S202. If the control unit 101 determined that the own vehicle is on the elevated road (S210→Yes), the control unit 101 transmits the road data to the front panel display control unit 109, and simultaneously instructs the front panel display control unit 109 to normally draw the link on the front panel 110. The front panel display control unit 109, which is instructed, normally draws the link on the front panel 110 based on the dot sequence data 303 of the transmitted road data (S211).

If the control unit 101 determined that the own vehicle is not on an elevated road at the step S210, that is, if the control unit 101 determined that the own vehicle is located lower than the elevated road (S210→No), the control unit 101 transmits the road data (front side image signal including image data of the elevated road) to the front panel display control unit 109, and simultaneously instructs the front panel display control unit 109 to semi-transmissively draw the link on the front panel 110. The front panel display control unit 109, which is instructed, semi-transmissively draws the link on the front panel 110 based on the dot sequence data 303 of the transmitted road data (S212). A method of the semi-transmissive drawing is achieved by only making drawing color luminance of the elevated road half.

With the above, a car mark running on a non-elevated road can be seen easily, while maintaining a visual perceptibility of the elevated road.

Next, the control unit 101 checks whether or not processing is executed for all road data included in the obtained map data (S213). If the control unit 101 determined that the processing is not executed for the all road data included in the obtained map data (S213→No), the processing returns to the step S207. If the control unit 101 determined that the processing is executed for the all road data included in the obtained map data (S213→Yes), the processing for implementing the road display around the own vehicle ends.

In accordance with the above method, since a display effect such as popping up of an elevated road on a planar map is obtained in a display of the navigation apparatus 1, a visual perception for an existence of the elevated road can be implemented easily. In addition, checking of whether or not the car mark exists on an elevated road becomes easier, and the car mark running on a non-elevated road becomes easier to see too.

Figure 5:
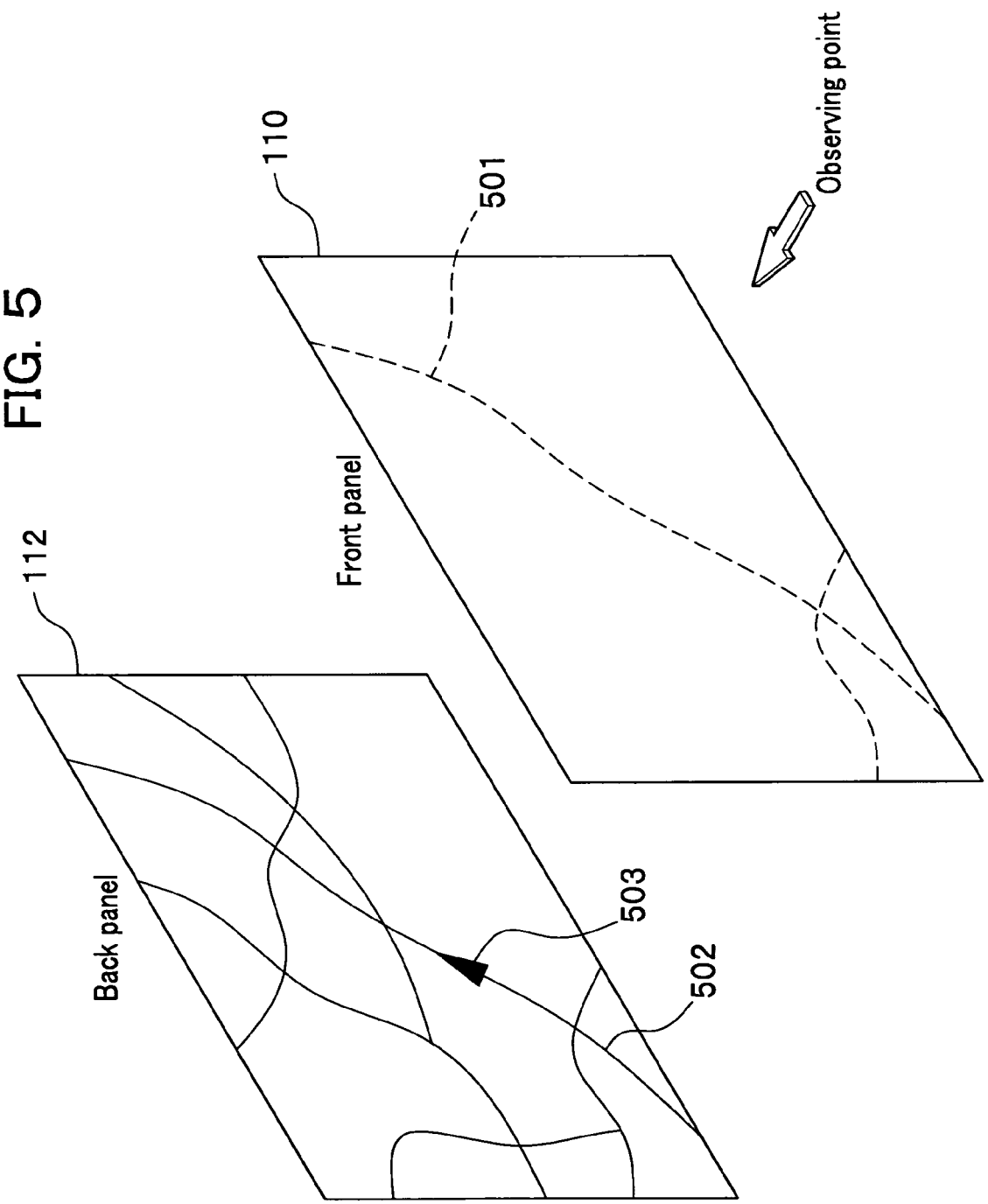
FIG. 5 is a screen sample of a map display when an own vehicle position is on a non-elevated road.

FIG. 5 is a screen sample of a map display when an own vehicle position is on a non-elevated road.

Since the own vehicle position exists on the non-elevated road, the car mark is drawn on the back panel 112. An elevated road 501 is semi-transmissively drawn on the front panel 110. A non-elevated road 502 and a car mark 503 are normally drawn on the back panel 112. With the above, it is easily recognized that the own vehicle is running under the elevated road. Meanwhile, if the own vehicle is running on a road other than the elevated road, the elevated road 501 is semi-transmissively drawn, even if the own vehicle is not under the elevated road.

Figure 6:
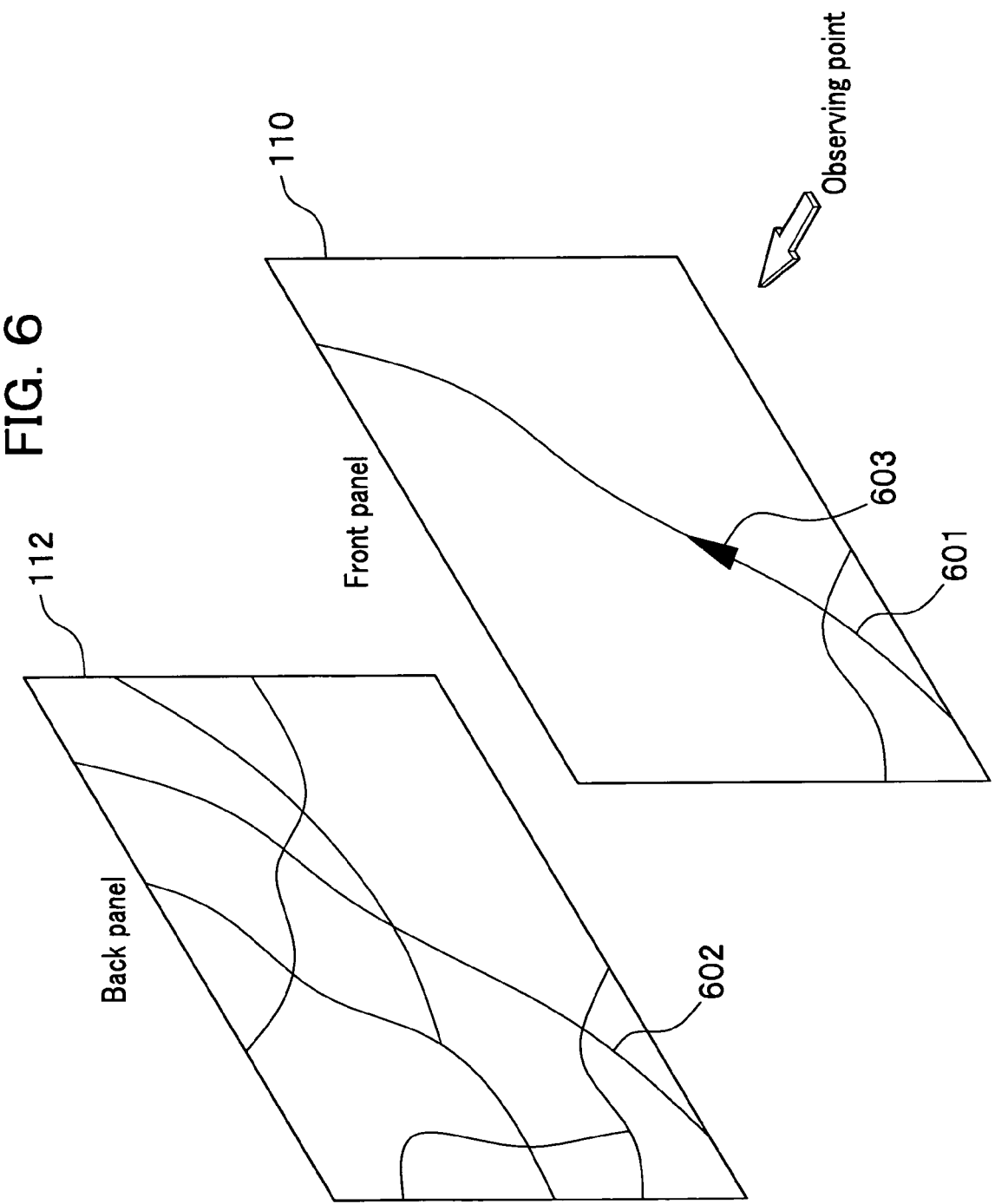
FIG. 6 is a screen sample of a map display when an own vehicle position is on an elevated road.

FIG. 6 is a screen image sample of a map display when an own vehicle position is on an elevated road.

A car mark 603 is drawn on the front panel 110. Since the own vehicle position is on an elevated road 601, the elevated road 601 is not semi-transmissively drawn, but normally drawn. With the above, the elevated road 601 is popped up against a map drawn on the back panel 112, thereby resulting in improvement of a visual perceptibility of the elevated road. In addition, it is easily visually percepted that the own vehicle is running on the elevated road 601. Meanwhile, a non-elevated road 602 is normally drawn on the back panel 112.

Figure 7:
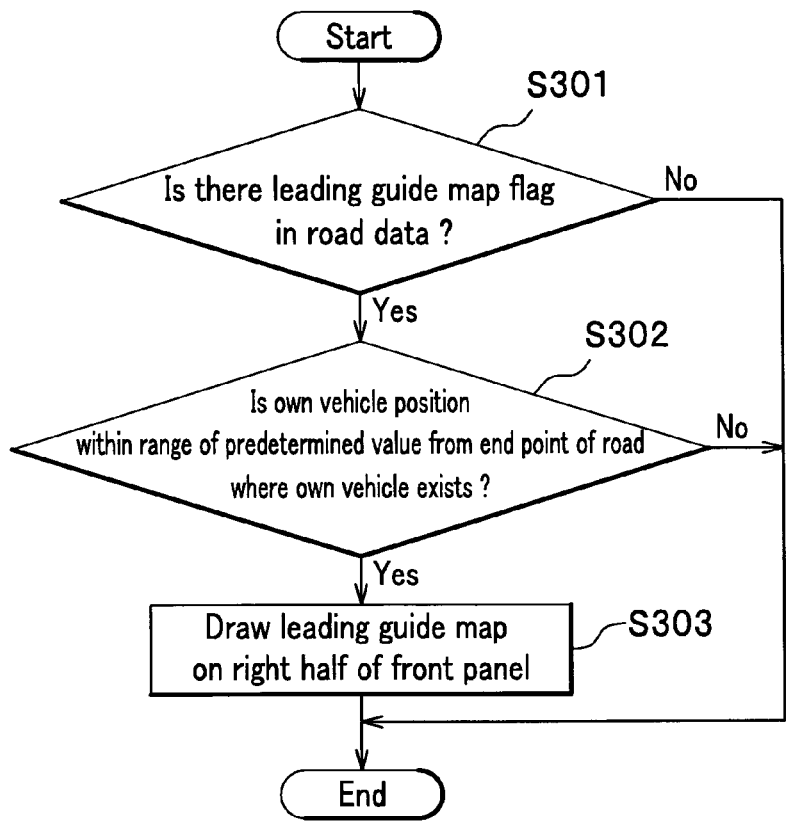
FIG. 7 is a flowchart showing a flow of processing for displaying a leading guide map according to the first embodiment.

Next, processing for the map display for displaying a leading guide map will be explained by referring to FIG. 7, together with FIGS. 1 to 3. FIG. 7 is a flowchart showing a flow of processing for displaying a leading guide map according to the first embodiment.

The control unit 101 investigates the attribute information 302 (refer to FIG. 3) of the road data obtained at the step S207 in FIG. 4, and determines whether or not a leading guide map flag of the attribute information 302 is set (S301). If the control unit 101 determined that the leading guide map flag is not set in the attribute information 302 (S301→No), the processing for the map display of the leading guide map ends. If the control unit 101 determined that the leading guide map flag is set in the attribute information 302 (S301→Yes), the processing proceeds to step S302. In the step S302, the control unit 101 obtains a distance between an own vehicle position and an end point (intersection where the own vehicle turns) of a road where the own car exists from the leading control unit 8, and determines whether or not the own vehicle position is within a predetermined range from the end point of the road where the own vehicle exists. A range of 300 m to 500 m is preferable for the predetermined range. At the step S302, if the control unit 101 determines that the own vehicle position is not in the predetermined range from the end point of the road where the own vehicle exists (S302→No), processing for displaying the leading guide map ends. On the other hand, at the step S302, if the control unit 101 determines that the own vehicle position is in the predetermined range from the end point of the road where the own vehicle exists (S302→Yes), the control unit 101 obtains the leading guide map data 304 from road data of the map storage unit 103, and transmits the obtained leading guide map data 304 (front side image signal including information of the leading guide map) to the front panel display control unit 109 and simultaneously instructs the front panel display control unit 109 to draw the leading guide map on a right half of the front panel 110. The front panel display control unit 109, which is instructed, draws the leading guide map on the right half of the front panel 110 (S303).

With this method, since a display effect such as popping up of the leading guide map on a planar map is obtained in a display of the navigation apparatus, a visual perceptibility of a leading guide display such as a quarter guide map and an enlarged intersection map, which are superimposed on the map display, can be improved.

Figure 8:
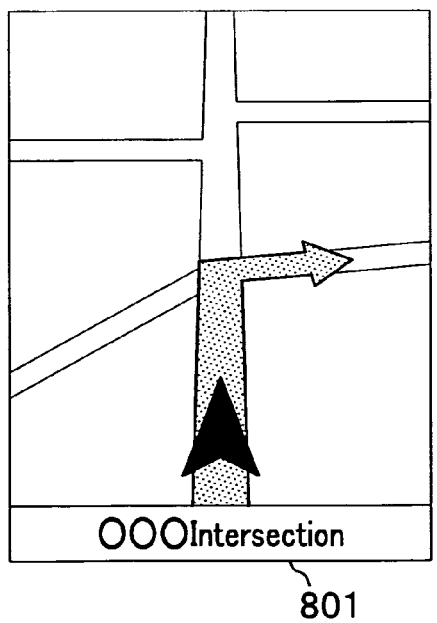
FIG. 8 is an example of an enlarged intersection illustration in a leading guide map.

FIG. 8 is an example of an enlarged intersection map in a leading guide map.

An enlarged intersection map 801 is an enlarged map of an intersection, and displayed on approximately half of a display area of a map display screen at a timing when the own vehicle approaches to an intersection where the own vehicle turns, when the own vehicle is running along with a route which is searched by the route search unit 104.

Figure 9:
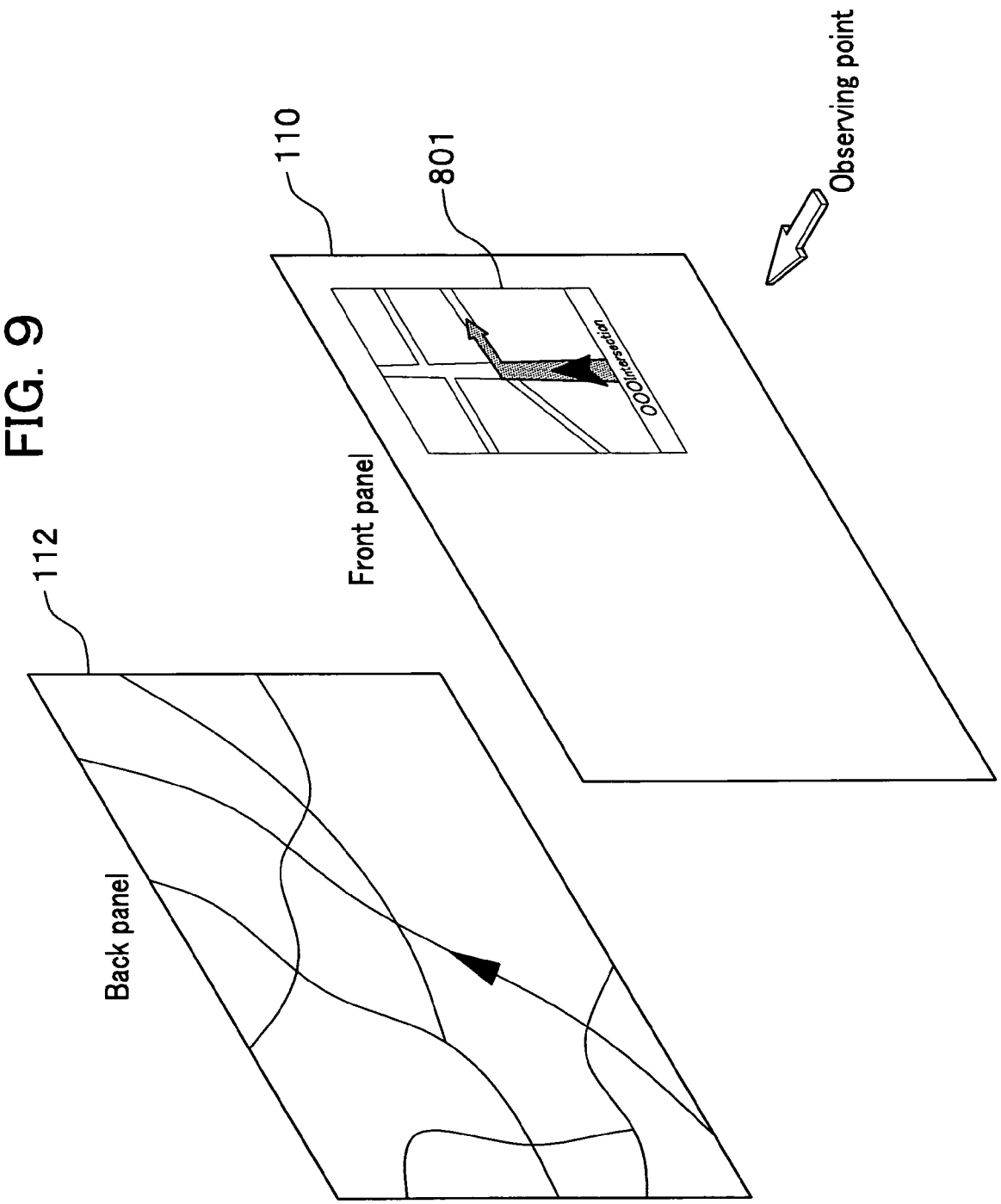
FIG. 9 is a screen example in a case where an enlarged intersection illustration is displayed on a right half of a front panel.

FIG. 9 is an example of a screen image of an enlarged intersection map displayed on a right half of a front panel.

Since the enlarged intersection map 801 is popped up against a map displayed on the back panel 112, a visual perceptibility is improved.

Meanwhile, in the embodiment, the enlarged intersection map has been shown as an example of the leading guide map. However, the present invention is not limited thereto. For example, the quarter guide map shown in FIG. 10 may be displayed.

Figure 10:
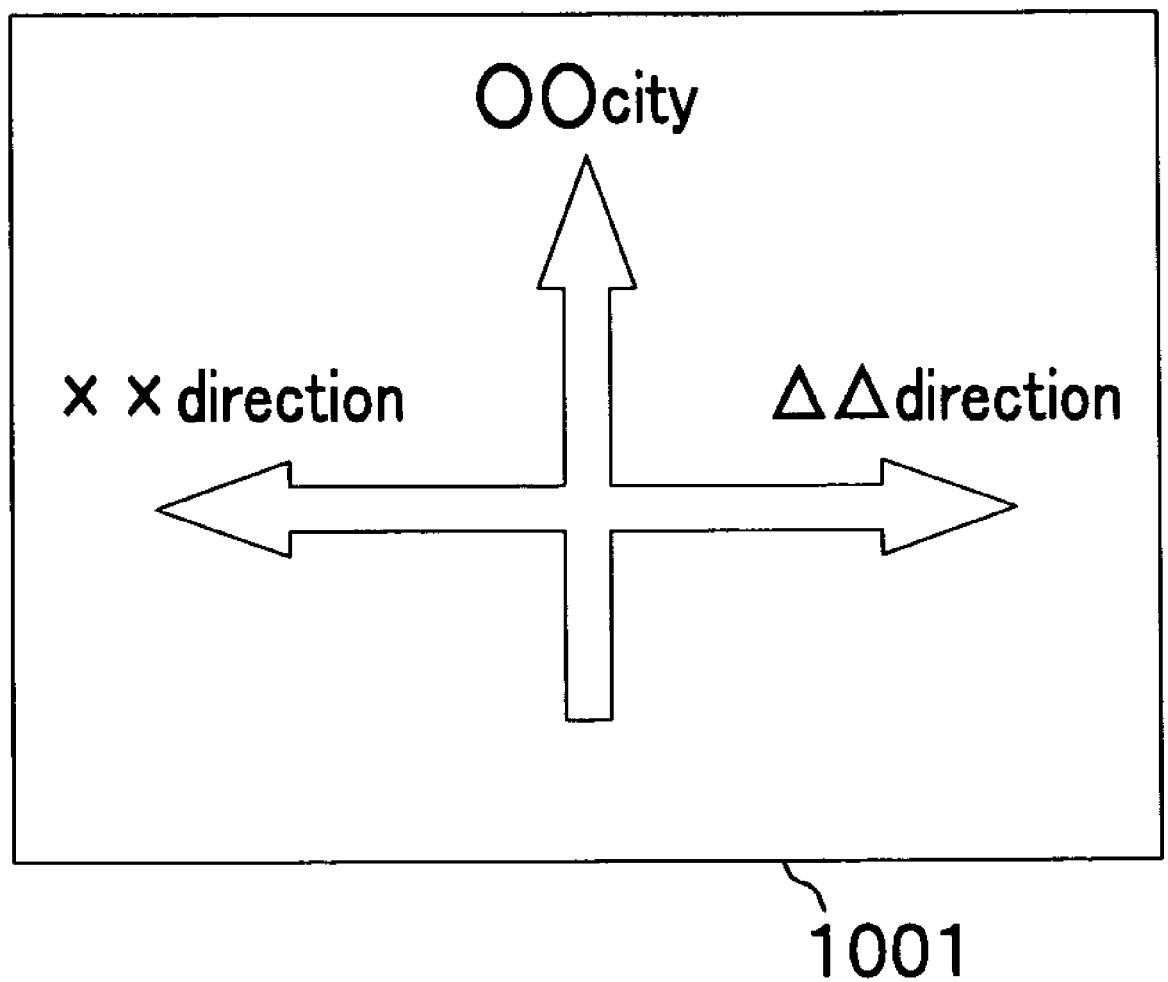
FIG. 10 is a screen example of a quarter guide map in a leading guide map.

FIG. 10 is an example of a quarter guide map in a leading guide map.

A quarter guide map 1001 indicates a direction of each road connected to a intersection, and is displayed by using approximately half of a display area of a screen in general when the own vehicle approaches to the intersection.

Figure 11:
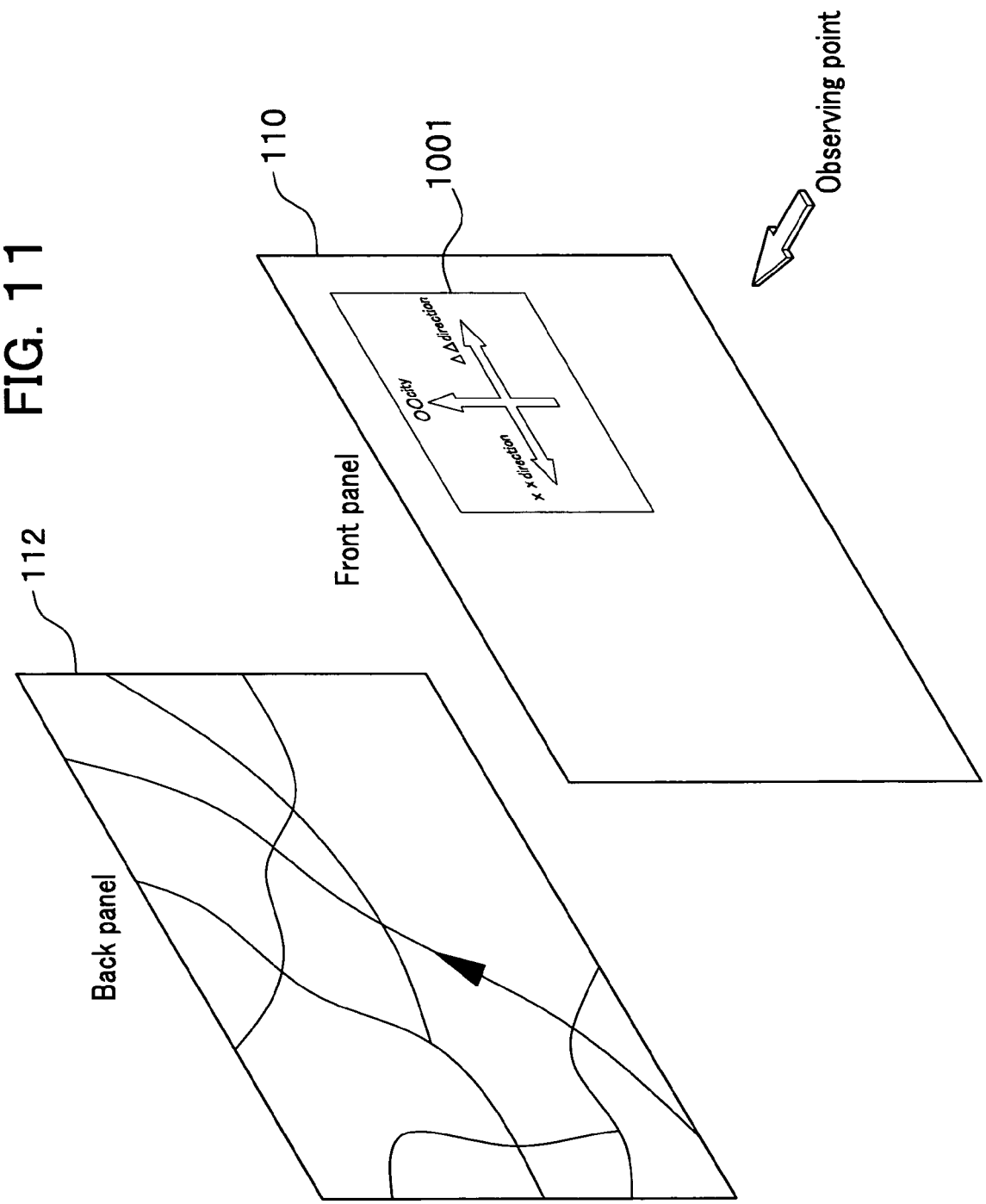
FIG. 11 is a screen example in a case where a quarter guide map is displayed on a right half of a front panel.

FIG. 11 is a screen example of a quarter guide map displayed on a right half of a front panel.

By displaying the quarter guide map 1001 on the right half of the front panel 110 like this, the quarter guide map 1001 is displayed to be popped up against a map which is displayed on the back panel 112. With the above, a visual perceptibility of the quarter guide map can be improved more than that of a map drawn on the back panel 112.

Meanwhile, when a quarter guide map is displayed as the leading guide map, the processing at the S110 in FIG. 2 is processing of the leading control unit 108 for determining whether or not a distance between the own vehicle and an intersection is not more than a threshold value. In addition, an enlarged intersection map can be displayed as well as a quarter guide map on the front panel 110. At this time, processing for displaying the quarter guide map may be executed before or after the processing of the enlarged intersection map.

Second Embodiment

Next, a second embodiment of the present invention will be explained by referring to FIGS. 12 to 16.

Meanwhile, since a basic configuration and processing of a navigation apparatus, an image display method, and an image display program of the present embodiment are in common with the aforementioned first embodiment, a same symbol is labeled to a common part in both embodiments and an explanation thereof is omitted. Only a characteristic part of the second embodiment will be explained.

Figure 12:
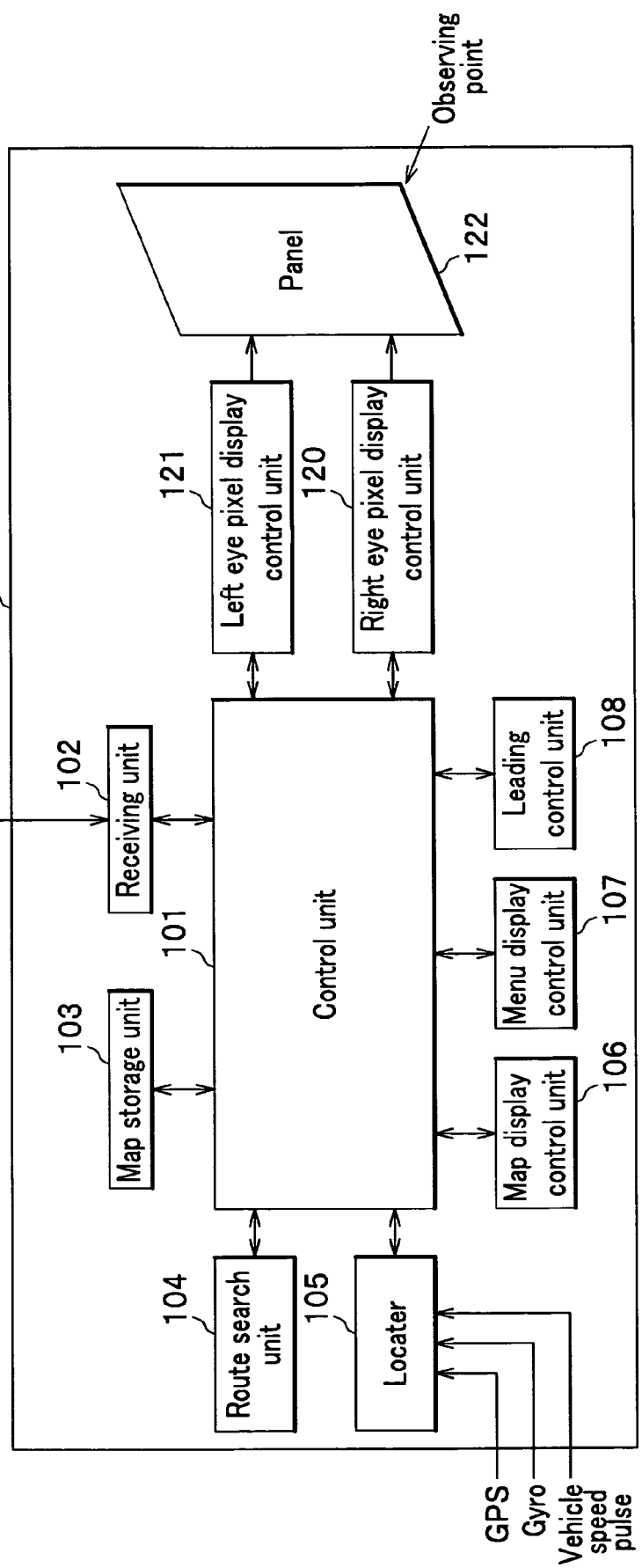
FIG. 12 is a block diagram showing a configuration of an in-vehicle navigation system according to the second embodiment of the present invention.

FIG. 12 is a block diagram showing a configuration of an in-vehicle navigation system according to the second embodiment.

The navigation system of the embodiment is configured to include a navigation apparatus 12.

The navigation apparatus 12 includes a right eye pixel display control unit 120, a left eye pixel display control unit 121, and a panel 122.

Figure 13:
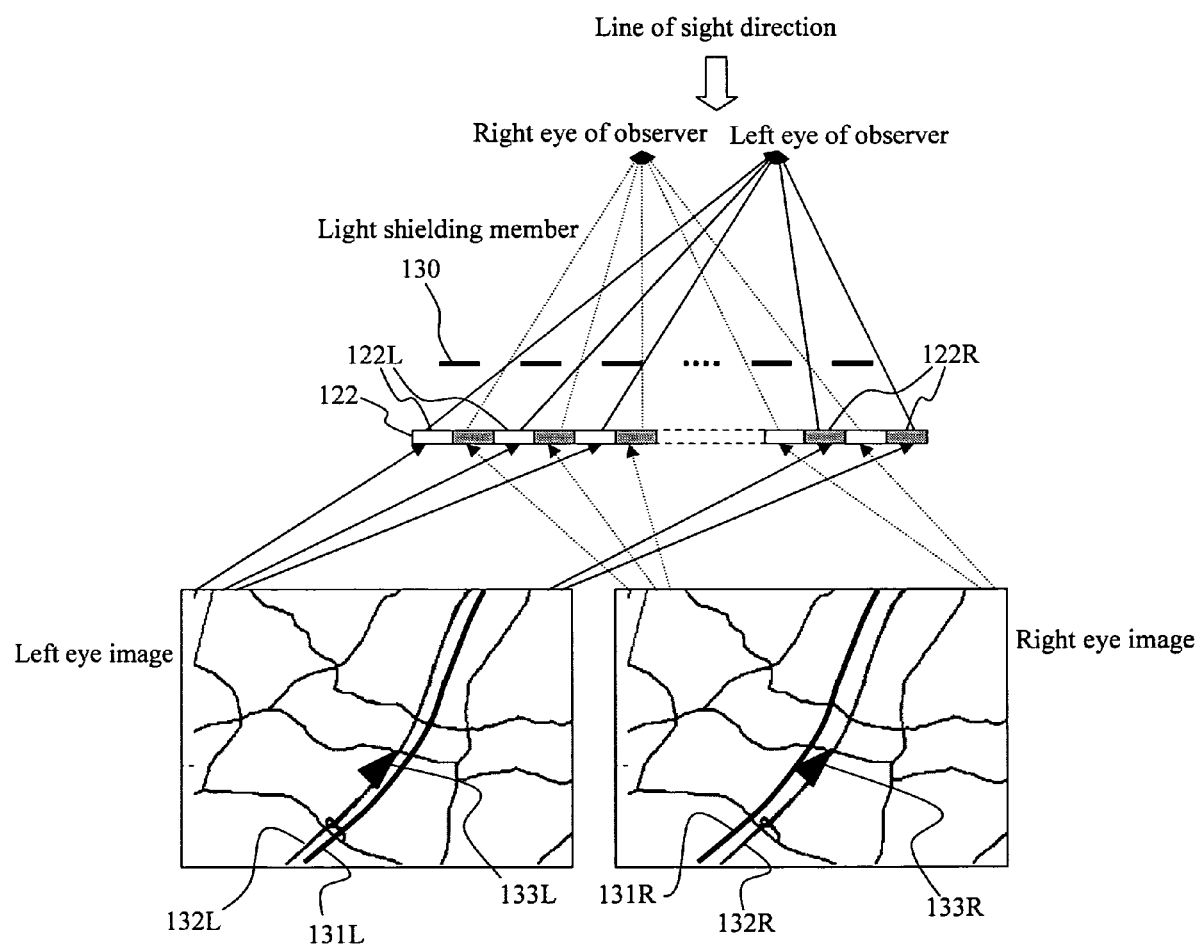
FIG. 13 is an illustration showing a principle of a stereo display according to the second embodiment.

FIG. 13 is an illustration showing a principle of a stereo display according to the second embodiment.

Meanwhile, in the embodiment, to draw an image so as to be seen apparently at a front side due to a principle of the stereo display described later is described as "to draw an image at a front side", and to draw an image so as to be seen apparently at a back side due to the principle is described as "to draw an image at a back side".

According to the embodiment, in the panel 122 of a single liquid crystal panel, a left eye pixel 120L for drawing a left eye image and a right eye pixel 120R for drawing a right eye image are arranged alternately by one pixel in a horizontal direction. In addition, a light shielding member 130 of which slit interval is adjusted is disposed at a front side of the panel 122 from an observer so that a left eye image does not enter in the right eye, and a right eye image does not enter in the left eye. With the light shielding member 130, the light is separated so that the left eye image is seen by the left eye, and the right eye image is seen by the right eye. The left eye image and the right eye image are configured to be capable of stereovision, displacing the each image by a binocular disparity. Meanwhile, in the embodiment, separation of light is conducted by using the light shielding member 130. However, the separation is not limited thereto, and may be conducted using a lenticular lens disposed behind the panel 122 from the observer. The details are disclosed in Japanese Laid-Open Patent Publication No. 6-311536.

For example, in the left eye image, an elevated road 131L, a non-elevated road 132L, and a car mark 133L are arranged and drawn as shown in FIG. 13. In addition, in the right eye image, an elevated road 131R, a non-elevated road 132R, and a car mark 133R are arranged and drawn as shown in FIG. 13. As shown in FIG. 13, the left eye image and the right eye image are generated, displacing each other by the binocular disparity. The left eye image generated like the above is sent to a left eye pixel 122L of the panel 122. Then, the left eye image is drawn on the left eye pixel 122L. The right eye image is also drawn on the right eye pixel 122R through similar processing to that of the left one. After that, a stereoscopic image can be obtained by separating the light so that the right eye image enters in the right eye and the left eye image enters in the left eye by the light shielding member 130. Making of the elevated road 131, or the car mark 133 to be semi-transmissive can be achieved by drawing semi-transmissively each elevated road 131L and 131R, or each car mark 133L and 133R of the left eye image and the right eye image. In addition, if an enlarged intersection map and a quarter guide map are drawn at a front side for a map image, an effect such as popping up of the enlarged intersection map and quarter guide map at the front side against the map image can be obtained.

Figure 14:
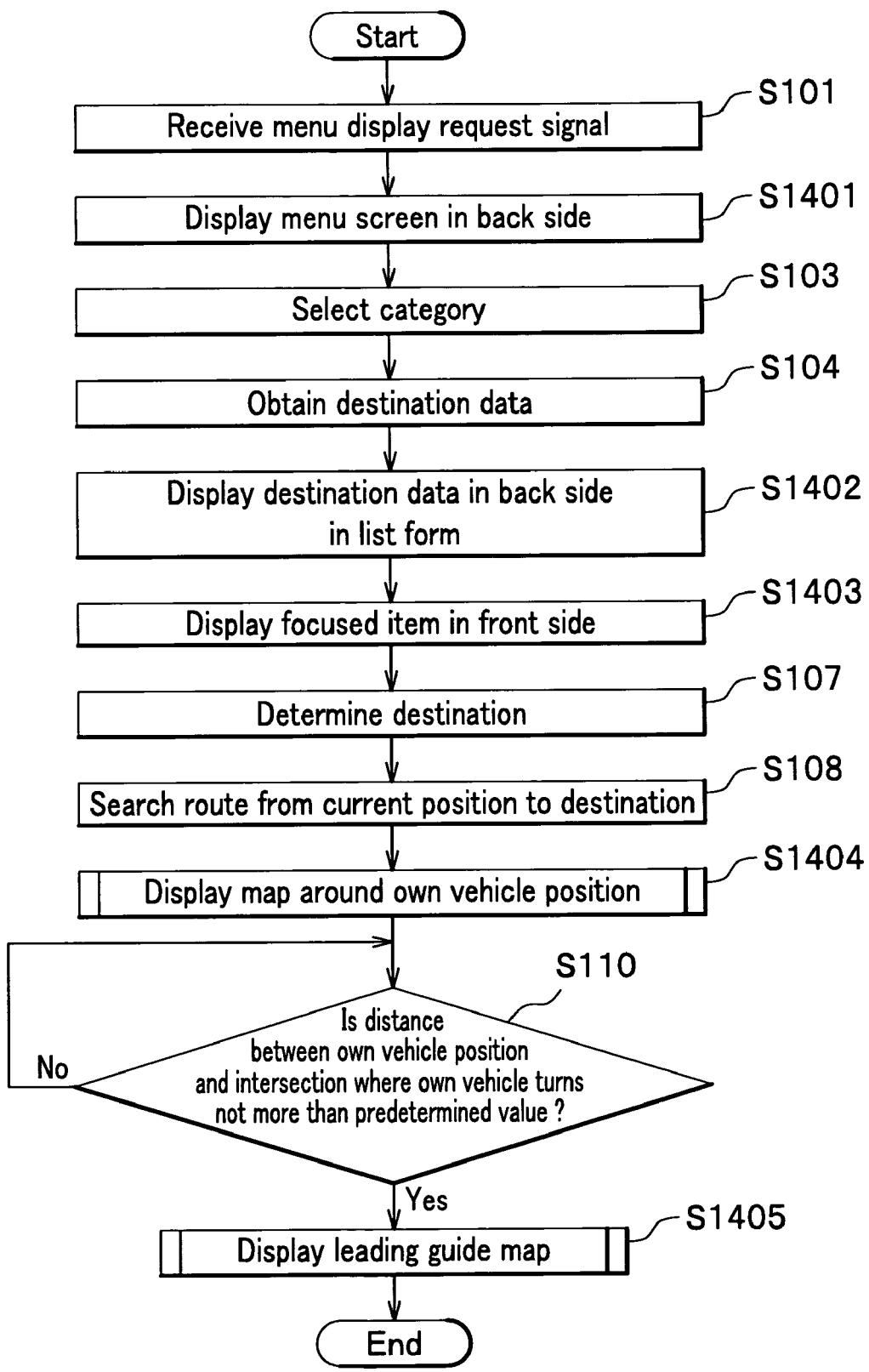
FIG. 14 is a flowchart showing a flow of processing of a map display for one screen according to the second embodiment.

FIG. 14 is a flowchart showing a flow of processing of a map display for one screen according to the second embodiment.

First, the receiving unit 102 receives a menu display request signal from the input apparatus 2 (S101), and transmits the received menu display request to the menu display control unit 107 through the control unit 101. Next, the menu display control unit 107 instructs the right eye pixel display control unit 120 and the left eye pixel display control unit 121 to display a menu screen for retrieving a destination through the control unit 101. The right eye pixel display control unit 120 and the left eye pixel display control unit 121, which are instructed, display the menu screen for retrieving the destination at the back side (S1401). For example, if the destination is retrieved by a category, several types of categories are displayed on the menu screen, and a user selects one of the categories via the input apparatus 2 (S103). That is, if the control unit 101 obtains a category signal from the input apparatus 2 through the receiving unit 102, the control unit 101 obtains destination data which belongs to the category from the map storage unit 103 (S104).

Then, the control unit 101 transmits the obtained destination data to the right eye pixel display control unit 120 and the left eye pixel display control unit 121, and simultaneously instructs the right eye pixel display control unit 120 and the left eye pixel display control unit 121 to display the destination data in a list form at the back side. The right eye pixel display control unit 120 and the left eye pixel display control unit 121, which are instructed, display transmitted destination data in the list form at the back side (S1402). In addition, the control unit 101 instructs the right eye pixel display control unit 120 and the left eye pixel display control unit 121 to display a focused item at the front side because, for example, the user has an intension to select the item in the list. The right eye pixel display control unit 120 and the left eye pixel display control unit 121, which are instructed, display the focused item at the front side (S1403) Meanwhile, processing at step S1403 is not always necessary. With the processing like the above, it is possible to make the item outstanding. Then, by letting the user select the item via the input apparatus 2, the destination is determined (S107) That is, the destination is determined by an input of a destination determination signal in the control unit 101 through the receiving unit 102.

Next, the control unit 101 obtains current position data, which is measured by the locater 105 using a vehicle speed pulse, and signals of the gyro and the GPS which are input in the locater 105, of the own vehicle from the locater 105, and transmits the current position data and destination data of the destination which is determined at the step S107 to the route search unit 104. The route search unit 104 searches a route to the destination from the current position based on transmitted current position data and destination data (S108) The route search unit 104 transmits the searched route to the control unit 101 and the leading control unit 108. The control unit 101 obtains map data around the own vehicle from the map storage unit 103 based on the transmitted route, and displays a map around the own vehicle (S1404). The details will be described later by referring to FIG. 15. A road of the route may be displayed in the map with a color distinguished from that of the other roads.

Meanwhile, the leading control unit 108 always calculates a distance between an own vehicle position and an intersection where the own vehicle turns, based on the input current position data from the locater 105 through the control unit 101 and the route which is transmitted from the route search unit 104, and always checks whether or not the distance between the own vehicle position and the intersection where the own vehicle turns is not more than a predetermined value (S110). If the leading control unit 108 determines that the distance between the own vehicle position and the intersection where the own vehicle turns is larger than the predetermined value (S110→No), the processing returns to the step S110. On the other hand, if the leading control unit 108 determines that the distance between the own vehicle position and the intersection where the own vehicle turns is not more than the predetermined value (S110 →Yes), the leading control unit 108 executes processing for displaying the leading guide map at step S1405, and ends processing of the map display for one screen. The details of the step S1405 will be described later by referring to FIG. 16.

Figure 15:
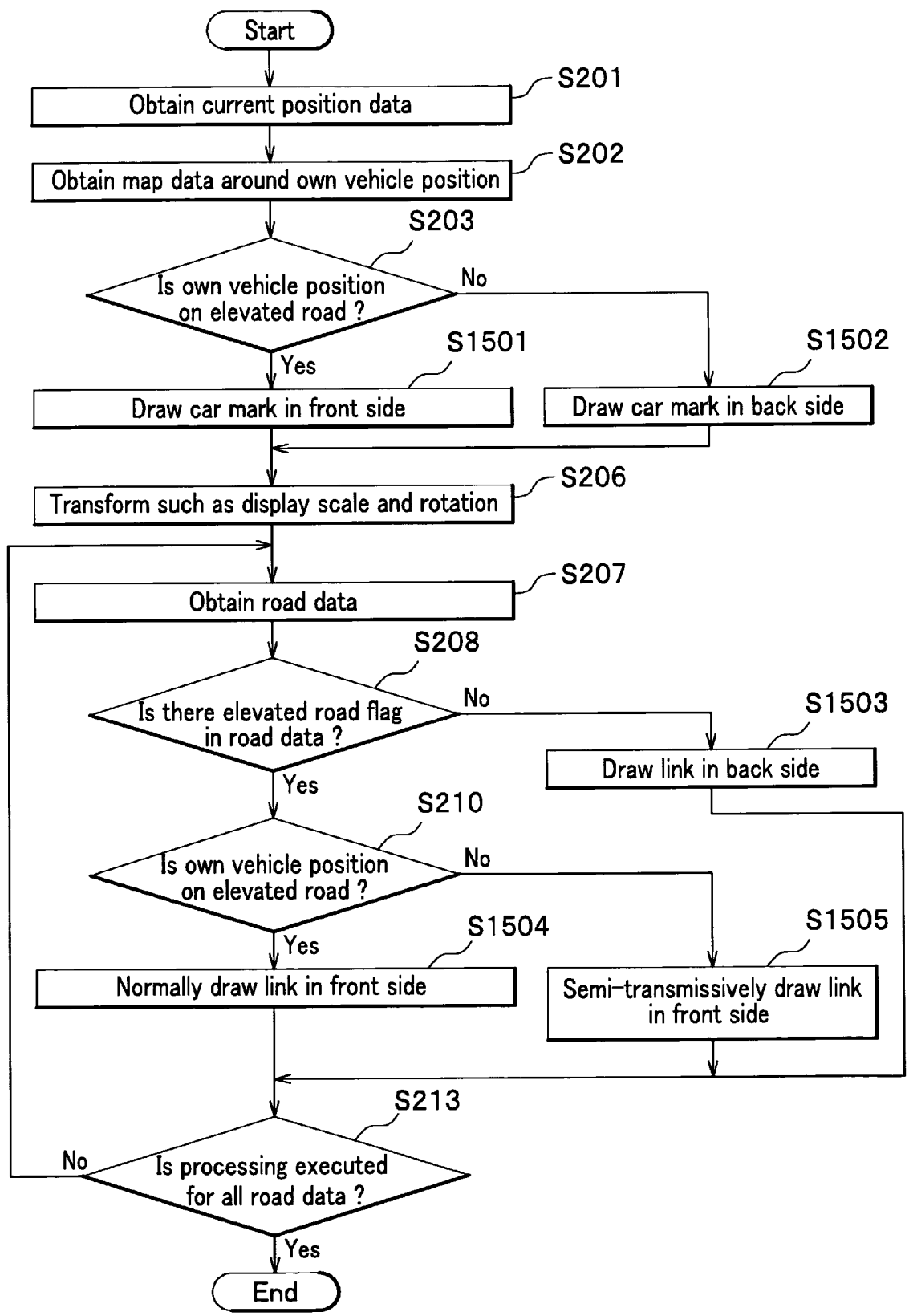
FIG. 15 is a flowchart showing a flow of processing of a map display around an own vehicle position according to the second embodiment.

Next, processing of a map display using road data will be explained by referring to FIG. 15, together with FIG. 3 and FIG. 12. FIG. 15 is a flowchart showing a flow of processing for implementing a map display around the own vehicle according to the second embodiment.

Meanwhile, steps S201 to S1502 are processing for displaying a car mark, and steps S206 to S213 are processing for drawing a link.

First, the control unit 101 obtains current position data of the own vehicle from the locater 105 (S201). Next, the control unit 101 transmits the current position data of the own vehicle, which is obtained at the step S201, to the map display control unit 106. Then, the map display control unit 106 obtains map data around the own vehicle (for one screen, a predetermined area including the current position of the own vehicle) from the map storage unit 103, based on the obtained current position data of the own vehicle (S202). After that, the control unit 101 checks whether or not the own vehicle is on an elevated road, based on the obtained current position data and road data included in the map data, for the map data of a display area (area for one screen) of the predetermined area including the own vehicle position, as a checking target (S203) Specifically, whether the own vehicle exists on an elevated road or a non-elevated road is checked based on information obtained from the locater 105. That is, information on an up and down motion of the vehicle is included in information of the gyro input in the locater 105. As aforementioned, the road data is included in the map data obtained at the step S202, and the elevated road flag is set in each link. The control unit 101 calculates a link where the own vehicle exists from the current position, and checks whether or not the own vehicle position exists on an elevated road, based on information of the up and down motion of the vehicle and the elevated road flag. If the own vehicle position is determined to be on the elevated road by the control unit 101 (S203→Yes), the control unit 101 instructs the right eye pixel display control unit 120 and the left eye pixel display control unit 121 to draw the car mark at the front side. The right eye pixel display control unit 120 and the left eye pixel display control unit 121, which are instructed, draw the car mark at the front side (S1501), and the processing proceeds to the step S206. At the step S203, if the control unit 101 determines that the own vehicle position is not on the elevated road (S203→No), the control unit 101 instructs the right eye pixel display control unit 120 and the left eye pixel display control unit 121 to draw the car mark at the back side. The right eye pixel display control unit 120 and the left eye pixel display control unit 121, which are instructed, draw the car mark at the back side (S1502).

The map display control unit 106 implements transformation of such as a display scale and rotation of the map data for fitting the map data, which is obtained on a display screen, to the display screen (S206), and transmits the transformed map data to the control unit 101. Then, the control unit 101 obtains road data of an arbitrary link included in obtained map data (S207). After that, the control unit 101 investigates the attribute information 302 of the obtained road data, and checks whether or not an elevated road flag exists (S208). If the elevated road flag does not exist, that is, if the link is not an elevated road (S208→No), the control unit 101 transmits the road data to the right eye pixel display control unit 120 and the left eye pixel display control unit 121, and simultaneously instructs the right eye pixel display control unit 120 and the left eye pixel display control unit 121 to draw the link at the back side. The right eye pixel display control unit 120 and the left eye pixel display control unit 121, which are instructed, draw the link at the back side based on the dot sequence data 303 of transmitted road data (S1503).

At the step S208, if the elevated road flag exists in the road data obtained by the control unit 101, that is, if the link is an elevated road (S208→Yes), a drawing content is changed depending on a status of an own vehicle position. First, the control unit 101 checks whether or not the own vehicle position is on the elevated road, based on the current position data obtained at the step S201 (S210). A checking method for determining whether or not the own vehicle position is on the elevated road is same with that used at the step S202. If the control unit 101 determines that the own vehicle position is on the elevated road (S210→Yes), the control unit 101 transmits the road data to the right eye pixel display control unit 120 and the left eye pixel display control unit 121, and simultaneously instructs the right eye pixel display control unit 120 and the left eye pixel display control unit 121 to normally draw the link at the front side. The right eye pixel display control unit 120 and the left eye pixel display control unit 121, which are instructed, normally draw the link at the front side based on dot sequence data 303 of the transmitted road data (S1504).

At the step S210, if the control unit 101 determines that the own vehicle position is not on an elevated road, that is, if the control unit 101 determines that the own vehicle position is located lower than the elevated road (S210→No), the control unit 101 transmits the road data (right eye image signal and left eye image signal which include image data of the elevated road) to the right eye pixel display control unit 120 and the left eye pixel display control unit 121, and simultaneously instructs the right eye pixel display control unit 120 and the left eye pixel display control unit 121 to semi-transmissively draw a link at the front side. The right eye pixel display control unit 120 and the left eye pixel display control unit 121, which are instructed, semi-transmissively draw the link at the front side based on dot sequence data 303 of the transmitted road data (S1505). A method of semi-transmissive drawing is achieved by only making drawing color luminance of the elevated road half.

Thus, a display of the car mark running on a non-elevated road can be seen easily, while maintaining a visual perceptibility of an elevated road.

Next, the control unit 101 checks whether or not processing for all road data included in the obtained map data is executed (S213). If the control unit 101 determines that the processing for the all road data included in the obtained map data is not executed (S213→No), the processing returns to the step S207. If the control unit 101 determines that the processing for the all road data included in the obtained map data is executed (S213→Yes), processing for implementing a road display around the own vehicle position ends.

With the above method, since a display effect such as popping up of an elevated road on a planar map is obtained in a display of a navigation apparatus, an existence of an elevated road can be visually perceived with ease. In addition, a checking of whether or not the car mark exists on the elevated road becomes easier, and also a display of the car mark running on a non-elevated road becomes easier to see too.

Figure 16:
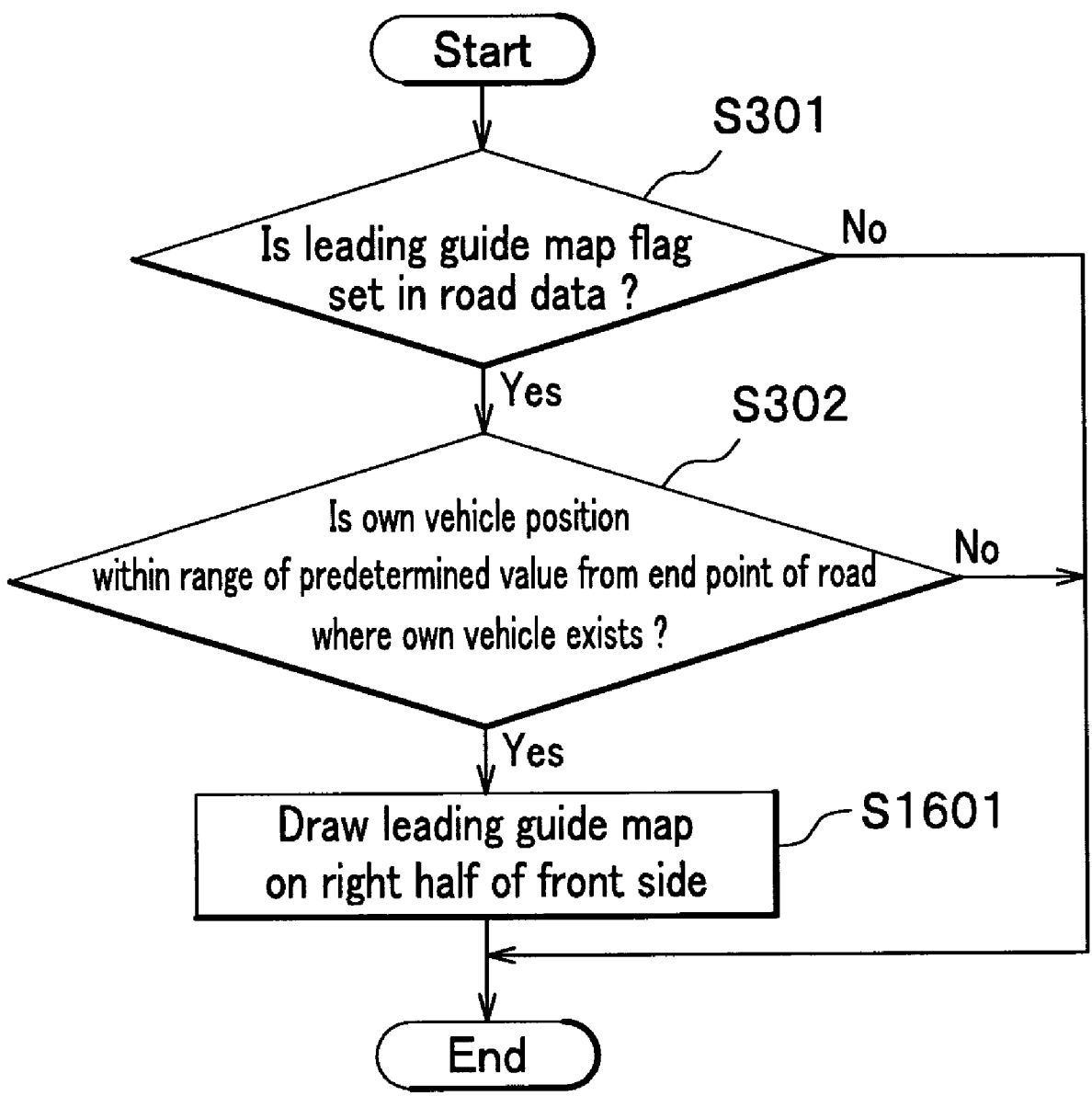
FIG. 16 is a flowchart showing a flow of processing for displaying a leading guide map according to the second embodiment.

Next, processing of a map display for displaying a leading guide map will be explained by referring to FIG. 16 together with FIG. 2, FIG. 3, and FIG. 12. FIG. 16 is a flowchart showing a flow of processing for displaying the leading guide map according to the second embodiment.

The control unit 101 investigates the attribute information 302 of the road data obtained at the step S207 in FIG. 15 (refer to FIG. 3), and determines whether or not a leading guide map flag of the attribute information 302 is set (S301). If the control unit 101 determines that the leading guide flag is not set in the attribute information 302 (S302 →No), processing for displaying the leading guide map ends. On the other hand, if the control unit 101 determines that the leading guide flag is set in the attribute information 302 (S302 →Yes), the processing proceeds to the step S302. At the step S302, the control unit 101 obtains a distance between an own vehicle position and an end point (intersection where the own vehicle turns) of a road where the own vehicle exists from the leading control unit 108, and checks whether or not the own vehicle position is within a predetermined range from the end point of the road where the own vehicle exists. A range of about 300 m to 500 m is preferable for the predetermined range. At the step S302, if the control unit 101 determines that the own vehicle position is not within the predetermined range from the end point of the road where the own vehicle exists. (S302→No), processing for displaying the leading guide map ends. If the control unit 101 determines that the own vehicle position is within the predetermined range from the end point of the road where the own vehicle exists (S302→Yes) the control unit 101 obtains the leading guide map data 304 from the road data of the map storage unit 103. Then, the control unit 101 transmits the obtained leading guide map data 304 (front side image signal which includes information of the leading guide map) to the right eye pixel display control unit 120 and the left eye pixel display control unit 121, and simultaneously instructs the right eye pixel display control unit 120 and the left eye pixel display control unit 121 to draw the leading guide map on a right half of the front side. The right eye pixel display control unit 120 and the left eye pixel display control unit 121, which are instructed, draw the leading guide map on the right half of the front side based on transmitted leading guide map data (S303).

With the above method, since a display effect where the leading guide map is popped up on a planar map is obtained in a display of the navigation apparatus 1, a visual perceptibility of a leading guide display such as a display of the quarter guide map and the enlarged intersection map, which are displayed by superimposing them on the map display, can be improved.

What is claimed is:

1. A navigation apparatus, comprising:
   a front side image display unit for displaying an image of a front side and a back side image display unit for displaying an image of a back side, each image being one of images which stereoscopically overlap along a line of sight;
   a measuring unit for measuring a current position of an own vehicle;
   a map storage unit for storing map data which includes information indicating whether or not a feature is an elevated road and data of an image of a road; and
   a control unit for controlling an image of a map around a position of the own vehicle to be displayed on the front side image display unit and back side image display unit, by acquiring the map data of a predetermined area, where the current position of the own vehicle is included, from the map storage unit, based on the current position of the own vehicle measured by the measuring unit,
   wherein the control unit transmits the data of an image of a road of the acquired map data to the back side image display unit and determines whether or not the elevated road exists in the predetermined area, based on the information indicating whether or not the feature, which is registered as the map data, is the elevated road,
   wherein when the control unit determines that the elevated road exists in the predetermined area, the control unit determines whether or not the current position of the own vehicle is on the elevated road, based on the current position of the own vehicle measured by the measuring unit,
   wherein when the current position of the own vehicle is not on the elevated road, the control unit transmits data of an image of the elevated road included in the map data to the front side image display unit,
   wherein the front side image display unit draws the image of the elevated road so that an image drawn on the back side image display unit can be visually percepted.

2. The navigation apparatus according to claim 1, wherein to draw the image of the elevated road so that an image drawn on the back side image display unit can be visually percepted is to draw the image of the elevated road semi-transmissively.

3. The navigation apparatus according to claims 1,
   wherein the front side image display unit and the back side image display unit are display panels which are disposed with a predetermined distance at a front side and back side overlapping along the line of sight.

4. The navigation apparatus according to claim 1,
   wherein in response to a determination that the current position of the own vehicle is in a predetermined position, the control unit transmits a front side image signal that includes information of a leading guide map to the front side image display unit to display
   the leading guide map on the front side image display unit.

5. The navigation apparatus according to claim 4,
   wherein the leading guide map is a quarter guide map or an enlarged intersection map.

6. An image display method for a navigation apparatus, the apparatus comprising:
   a front side image display unit for displaying an image of a front side and a back side image display unit for displaying an image of a back side, each image being one of images which stereoscopically overlap along the line of sight;
   a measuring unit for measuring a current position of an own vehicle; and
   a map storage unit for storing map data which includes information indicating whether or not a feature is an elevated road and data of an image of a road, the image display method comprising:
   reading the map data of a predetermined area where the current position of the own vehicle is included from the map storage unit, based on the current position of the own vehicle measured by the measuring unit;
   transmitting the data of an image of a road of the acquired map data to the back side image display unit;
   determining whether or not an elevated road exists in the predetermined area, based on information indicating whether or not the feature, which is registered as the map data, is the elevated road, and
   upon determining that that an elevated road exists in the predetermined area
   determining whether or not the current position of the own vehicle is on the elevated road, and upon determining that the current position of the own vehicle is not on the elevated road transmitting data of an image of the elevated road included in the map data provided to the front side image display unit, and wherein the front side image display unit draws the image of the elevated road so that an image drawn on the back side image display unit can be visually percepted.

7. The image display method for a navigation apparatus according to claim 6, wherein to draw the image of the elevated road so that an image drawn on the back side image display unit can be visually percepted is to draw the image of the elevated road semi-transmissively.

8. The image display method for a navigation apparatus according to claim 6, wherein the front side image display unit and the back side image display unit are display panels which are disposed with a predetermined distance at a front side and back side overlapping along the line of sight.

9. The image display method for a navigation apparatus according to claim 6, wherein upon determining that the current position of the own vehicle is in a predetermined position transmitting a front side image signal that includes information for a leading guide map to the front side image display unit; and displaying, using the front side image display unit, the leading guide map on the front side image display unit.

10. The image display method for a navigation apparatus according to claim 9, wherein the leading guide map is a quarter guide map or an enlarged intersection map.

11. An image display program product comprising a program, readable by a computer, that causes the computer to execute the image display method according to claim 10, comprising:

a first sub-module program for functioning the front side image display unit for displaying the image of the front side and back side image display unit for displaying the image of the back side, each image being one of images which stereoscopically overlap along the line of sight;

a second sub-module program for generating the front side image signal for displaying the image of the front side;

a third sub-module program for functioning the measuring unit for measuring the current position of the own vehicle;

a fourth sub-module program for functioning the map storage unit for storing the map data which includes the information indicating whether or not the feature is the elevated road and data of the image of the road; and a fifth sub-module program for functioning a control unit for controlling the front side image display unit, the back side image display unit, the measuring unit, and the map storage unit, wherein the control unit acquires the map data of the predetermined area where the current position of the own vehicle is included from the map storage unit, based on the current position of the own vehicle measured by the measuring unit;

determines whether or not the elevated road exists in the predetermined area, based on information indicating whether or not the feature, which is registered as the map data, is the elevated road, and wherein when the control unit determines that the elevated road exists in the predetermined area, the control unit determines whether or not the current position of the own vehicle is on the elevated road, based on the current position of the own vehicle measured by the measuring unit, and wherein when the current position of the own vehicle is not on the elevated road, the control unit inserts the image of the elevated road included in the map data in the front side image signal; and transmits the front side image signal to the front side image display unit; and wherein the front side image display unit draws the image of the elevated road so that the image drawn on the back side image display unit can be visually percepted.

* * * * *